US012532801B2

(12) United States Patent
Abeles

(10) Patent No.: US 12,532,801 B2
(45) Date of Patent: Jan. 27, 2026

(54) APPARATUS AND METHOD FOR GROWING VEGETATION IN HOT ARID COASTAL ENVIRONMENTS

(71) Applicant: VIRIDIS ARBOR LLC, Verona, NJ (US)

(72) Inventor: Gary E Abeles, Verona, NJ (US)

(73) Assignee: VIRIDIS ARBOR LLC, Verona, NJ (US)

( * ) Notice: Subject to any disclaimer, the term of this patent is extended or adjusted under 35 U.S.C. 154(b) by 0 days.

(21) Appl. No.: 19/003,522

(22) Filed: Dec. 27, 2024

(65) Prior Publication Data

US 2025/0261580 A1    Aug. 21, 2025

Related U.S. Application Data

(63) Continuation-in-part of application No. 17/667,306, filed on Feb. 8, 2022, now Pat. No. 12,213,397, which
(Continued)

(51) Int. Cl.
*A01G 9/24* (2006.01)
*A01C 1/04* (2006.01)
(Continued)

(52) U.S. Cl.
CPC .............. *A01C 14/00* (2013.01); *A01C 1/044* (2013.01); *A01G 13/21* (2025.01); *A01G 20/20* (2018.02);
(Continued)

(58) Field of Classification Search
CPC ....... A01C 14/00; A01C 1/044; A01C 21/005; A01G 20/20; A01G 9/243; A01G 9/246; A01G 9/247; A01G 2009/248; A01G 7/00
See application file for complete search history.

(56) References Cited

U.S. PATENT DOCUMENTS 3,807,088 A * 4/1974 Jones ..................... A01G 31/02
47/17
4,242,833 A * 1/1981 Maes, Jr. ............... A01G 9/243
47/29.2
(Continued)

FOREIGN PATENT DOCUMENTS

WO    WO-2024159324 A1 *  8/2024    ............... F24D 9/00

OTHER PUBLICATIONS

Watts, G. (Sep. 2019). Farming in the desert. Adapted from Ingenia, Issue 80. Retrieved on Dec. 5, 2024 from https://www.ingenia.org.uk/articles/farming-in-the-desert/ . 10 pages.
(Continued)

*Primary Examiner* — Monica L Perry
(74) *Attorney, Agent, or Firm* — Maine Cernota & Curran

(57) ABSTRACT

An apparatus and method for growing vegetation in a hot, arid, coastal location includes installing, at or below grade, a mat containing seeds, and/or seedlings, and a super absorbent polymer (SAP), the mat being cooperative with a thermally conductive network in thermal communication with an evaporative panel that is cooled by seawater evaporation, thereby drawing heat away from the mat. A seawater reservoir can collect seawater draining from the cooling panel. A pumping system can recirculate the collected seawater to the cooling panel, thereby converting the seawater into brine, which can be periodically transferred to a drying tray for production of salt. A perforated, transparent or translucent cover sheet can be placed on or suspended above the mat. A water barrier can be placed below the mat. The cooling panel can be incorporated into a wall of a cooling greenhouse that surrounds and contains the mat.

20 Claims, 9 Drawing Sheets

Related U.S. Application Data is a continuation-in-part of application No. 16/853,981, filed on Apr. 21, 2020, now Pat. No. 11,277,962, which is a continuation of application No. 15/476,017, filed on Mar. 31, 2017, now Pat. No. 10,660,264, which is a continuation-in-part of application No. 14/203,872, filed on Mar. 11, 2014, now Pat. No. 9,629,341.

(60) Provisional application No. 61/786,721, filed on Mar. 15, 2013.

(51) Int. Cl.
| | | |
|---|---|---|
| *A01C 14/00* | (2006.01) | |
| *A01G 13/21* | (2025.01) | |
| *A01G 20/20* | (2018.01) | |
| *A01C 21/00* | (2006.01) | |
| *A01G 24/35* | (2018.01) | |

(52) U.S. Cl.
CPC .............. *A01C 21/00* (2013.01); *A01G 24/35* (2018.02); *Y02A 40/28* (2018.01)

(56) References Cited

U.S. PATENT DOCUMENTS

| | | | |
|---|---|---|---|
| 2013/0192131 A1* | 8/2013 | Abahusayn | A01G 9/14 47/17 |
| 2015/0223409 A1* | 8/2015 | Abahusayn | A01G 9/14 47/17 |
| 2018/0020626 A1* | 1/2018 | Kellogg | A01G 9/246 47/17 |
| 2020/0182493 A1* | 6/2020 | Luttik | A01G 9/246 |
| 2023/0148487 A1* | 5/2023 | Croce | A01G 7/00 47/21.1 |
| 2023/0403995 A1* | 12/2023 | Despujols | A01G 13/08 |
| 2025/0330116 A1* | 10/2025 | Allen | H02S 30/20 |

OTHER PUBLICATIONS

Corbley, M. (Oct. 4, 2019). "Drought-Proof 'Cooling Houses' Use Saltwater and Cardboard to Grow Tons of Healthy Produce in the Desert". Goodnewsnetwork. org. Retrieved on Dec. 5, 2024 from https://www.goodnewsnetwork.org/cooling-houses-use-saltwater-and-cardboard-to-produce-in-deserts/ . 3 pages.

* cited by examiner

APPARATUS AND METHOD FOR GROWING VEGETATION IN HOT ARID COASTAL ENVIRONMENTS

RELATED APPLICATIONS

This application is a continuation in part of U.S. application Ser. No. 17/667,306, filed on Feb. 8, 2022. application Ser. No. 17/667,306 is a continuation in part of U.S. application Ser. No. 16/853,981, filed on Apr. 21, 2020, now U.S. Pat. No. 11,277,962. application Ser. No. 16/853,981 is a continuation of U.S. application Ser. No. 15/476,017, filed Mar. 31, 2017, now U.S. Pat. No. 10,660,264. application Ser. No. 15/476,017 is a continuation in part of U.S. application Ser. No. 14/203,872, filed Mar. 11, 2014, now U.S. Pat. No. 9,629,341. application Ser. No. 14/203,872 claims the benefit of U.S. provisional application 61/786,721, filed Mar. 15, 2013. All of these applications are herein incorporated by reference in their entirety for all purposes.

FIELD OF THE INVENTION

The invention relates to apparatus and methods for growing vegetation, and more specifically to apparatus and methods for growing vegetation in hot, arid coastal environments.

BACKGROUND OF THE INVENTION

Hot, arid environments such as deserts and semi-deserts are often inhospitable to most vegetation. Nevertheless, under certain circumstances it can be desirable to introduce new vegetation into a hot, arid environment so as to stabilize the underlying sand or soil, reduce the prevalence of blown dust and sand, beautify the landscape, and/or re-establish an ecosystem after it has been damaged by industrial activity or by a natural disaster. Furthermore, it may be desirable to grow vegetation such as edible food plants in a hot, arid environment while minimizing the cost and labor associated with initiating and maintaining the vegetation.

Unfortunately, the initial introduction of such vegetation can be difficult and time consuming, due to the poor water retention of the sand or soil, the slow growth that is typical of desert and semi-desert vegetation, and the fragility of immature vegetation until it has established a sufficient root system to allow it to obtain water and to resist wind and excess sun exposure.

Of course, scarcity of water is the feature that defines an arid environment. When a hot, arid location is devoid of mature vegetation, this scarcity of water is typically multiplied, because high temperatures and the prevalence of unshaded sunshine can tend to quickly evaporate any moisture that is present. In addition, the ground in a hot, arid environment is often very sandy, such that any precipitation that falls as rain or forms on the surface as dew, and is not evaporated, tends to be absorbed quickly into the sand, whereupon it settles to a depth that is beyond reach of the root systems of immature vegetation.

Once vegetation is well established in a hot, arid location, it can play a significant autogenic role in improving the environment by blocking direct sunlight and by capturing and retaining available moisture before it is absorbed or evaporated. Furthermore, over time, decomposing vegetation can reduce the porosity of the soil and thereby further improve the retention of water near the surface. However, even newly-planted vegetation that is adapted to hot, arid environments often has a very difficult time surviving until it has matured, due to the scarcity of water, the low humidity, and the high temperatures that tend to drive away any moisture that may be present.

Most existing methods for introducing new vegetation into hot, arid ecosystems are extensions of traditional agronomic technologies developed under more hospitable climates, and require intensive tending and excessive use of irrigation to have any chance of success. Often, such an expenditure of time and resources is not practical, and serves as a barrier to the restoration and/or improvement of arid environments.

One recently introduced approach that is applicable to hot, arid, coastal environments is to raise vegetation within a cooling "greenhouse" comprising a shading net suspended above the ground by surrounding walls, wherein at least one of the walls comprises an evaporative panel that reduces the interior temperature by evaporative cooling. Each evaporative panel is made up of layers of corrugated cardboard that are stuck together so that the corrugations in alternate layers run at different angles, thereby causing air entering the panel to rapidly become highly turbulent. Seawater is pumped onto the evaporator panel, causing exterior air that impinges on the panel to be cooled and humidified as it flows through the panel into the interior of the greenhouse. Typically, seawater that is not evaporated from the panel is collected in a reservoir and recycled to the panel, thereby slowly converting the seawater into a high saline brine, which can be diverted into drying trays to produce salt as a marketable byproduct, while the reservoir is refilled with seawater. The low amounts of energy that are required to pump the seawater and brine can be readily supplied by modest solar panels.

While this "greenhouse" approach can be effective, it can be inconvenient, impractical, and/or economically impossible in some applications to enclose and protect vegetation in this manner. Also, while this approach may be effective in cooling the above ground air within the greenhouse, it does little to cool seeds and seedlings that are planted below the surface of the ground, and have not yet grown to extend above grade.

What is needed, therefore, is an apparatus and method for growing vegetation in hot, arid, costal environments that provides water retention and cooling in an at grade or below-grade environment that is adequate to enable seeds and/or seedlings to germinate and grow.

SUMMARY OF THE INVENTION

The present invention is an apparatus and method for growing vegetation in hot, arid, costal environments that provides water retention and cooling in in an at grade or below-grade environment that is adequate to enable seeds and/or seedlings to germinate and grow.

According to the disclosed invention, a mat assembly includes a mat, which can be a biodegradable coir mat, is impregnated with seeds and/or seedlings, and with a "super absorbent polymer" or "SAP." In embodiments, the SAP is biodegradable, and in some of these embodiments the SAP is a cellulose-based or starch-based polymer. The mat is also cooperative with a "thermally conductive network" that comprises at least one mesh, web, or other network of thermally conductive fibers, such as a mesh of copper wire or a network of high crystallinity polyethylene nanofibers.

In some embodiments, fertilizer is included in the mat. And in various embodiments at least one of sand and soil is included in the mat. The included sand or soil in some of these embodiments has a composition that is similar to sand or soil that is indigenous to the hot, arid, coastal location.

The mat is placed at the hot, arid, costal location, either at grade or slightly below grade, and sufficient fresh water is applied to cause the SAP to become hydrated, thereby enabling the seeds and/or seedlings to sprout and/or take root in the mat. An evaporative cooling system comprising an evaporative panel is located near the mat, and is thermally coupled to the thermally conductive network that is cooperative with the mat. Seawater is applied to the evaporative panel, causing the panel to be cooled by evaporation of the seawater, so that the evaporative panel draws heat away from the mat via the thermally conductive network that is cooperative with the mat, thereby further reducing evaporative loss of moisture from the mat.

In embodiments, seawater that is not evaporated from the evaporative panel drains into a seawater reservoir and is recycled by a pumping system to the evaporative panel, thereby slowly converting the recycle seawater into a high saline brine, which can be diverted into drying trays to produce salt as a marketable byproduct, while the seawater reservoir is refilled with seawater. In embodiments, the energy that is required to pump the seawater and brine is supplied by one or more solar panels.

In various embodiments, once the mat is placed at the hot, arid coastal location, it is covered by a perforated cover sheet that is transparent or semi-transparent. The cover sheet serves as a physical barrier to water vapor beneath the cover sheet that is formed by evaporating dew and by any moisture that is evaporated from the ground or mat, so that the water vapor tends to condense on the under-side of the cover sheet, and to drip back onto the mat, where it is absorbed by the SAP.

In some of these embodiments the cover sheet is placed directly onto the mat, whereby the growing vegetation lifts the cover sheet, and in embodiments eventually breaks through the cover sheet. In other embodiments, the cover sheet is supported above the mat by a support structure, such as a plurality of stakes. The opacity of the cover sheet can be increased by printing a pattern onto the cover sheet, adding a dye to the cover sheet material, or by any other means known in the art, so as to reduce the intensity of light reaching the mat, and thereby reduce solar heating, by emulating the shade that would be provided by mature vegetation in an established ecosystem.

Embodiments further include a water barrier placed below the mat which prevents any water that is not retained by the mat and SAP from reaching the underlying soil or sand. This feature can be especially helpful in sandy locations where any moisture that reaches the underlying sand will be quickly absorbed and lost. The water barrier can be a plastic sheet, and can be cellulosic or otherwise biodegradable.

In various embodiments, the evaporative panel is offset from the mat, and the mat assembly is otherwise exposed to the environment. In other embodiments, the evaporative panel is incorporate into at least one wall of a cooling "greenhouse" in which the mat is sited. According to this approach, seeds and seedlings that do not rise significantly above the mat are cooled by thermal conduction from the thermally conductive network in the mat to the evaporative panels in the walls of the cooling greenhouse. As the vegetation germinates and grows, it receives additional cooling due to air that is cooled as it passes through the evaporative panel(s) into the greenhouse. The cooling greenhouse can further include an open mesh top that allows precipitation to enter the greenhouse, and also allows heated air to rise upward out of the greenhouse, while reducing the amount of direct sunlight that impinges on the mat and the vegetation.

A first general aspect of the present invention is an apparatus for growing vegetation in a hot, arid, coastal location. The apparatus includes a mat, a super-absorbent polymer ("SAP") cooperative with the mat, seeds and/or seedlings cooperative with the mat, a thermally conductive network cooperative with the mat, and an evaporative cooling system comprising an evaporative panel in thermal communication with the thermally conductive network.

In embodiments, the mat includes coir.

Any of the above embodiments can further comprise fertilizer included with the mat.

Any of the above embodiments can further comprise at least one of sand and soil included with the mat.

Any of the above embodiments can further comprise a perforated, transparent or semi-transparent cover sheet configured for covering the mat. Some of these embodiments further comprise a support structure configured for suspending the cover sheet above the mat. In some of these embodiments, the support structure includes a plurality of stakes that support the cover sheet at spaced-apart support locations below the cover sheet. And in some of these embodiments the cover sheet is perforated at locations that are spaced apart from the support locations of the stakes.

Any of the above embodiments can further comprise a water barrier configured for placement below the mat.

In any of the above embodiments, the evaporative cooling system can further comprise a seawater reservoir configured to collect seawater that drains from the evaporative panel. In some of these embodiments the evaporative cooling system further comprises a pumping system configured to recycle the collected seawater from the seawater reservoir to the evaporative panel, thereby converting the recycled seawater into brine. In some of these embodiments the evaporative cooling system further comprises a drying tray configured to accept the brine when it is pumped by the pumping system from the seawater reservoir to the drying tray, and to convert the brine into salt.

Any of the above embodiments that comprises a pumping system can further comprise a solar energy system configured to convert solar energy into electricity and to direct the electricity to the evaporative cooling system.

In any of the above embodiments, the evaporative panel can be incorporated into a wall of a cooling greenhouse configured to contain and surround the mat. In some of these embodiments the evaporative panel is a first of a plurality of evaporative panels incorporated into a plurality of walls of the cooling greenhouse. In any of these embodiments the evaporative greenhouse can further comprise a mesh cover that is permeable to air and rainwater, but reduces an amount of sunlight impinging on the mat when the mat is contained within and surrounded by the cooling greenhouse.

A second general aspect of the present invention is a method of growing vegetation at a hot, arid, costal location. The method comprises locating the apparatus according to any embodiment of the first general aspect at the hot, arid, coastal location, the mat being placed at grade or below grade, applying fresh water to the mat, thereby hydrating the SAP in the mat, and applying seawater to the evaporative panel, thereby cooling the evaporative panel and causing the evaporative panel to draw heat from the mat via the thermally conductive network.

In embodiments, the apparatus includes a pumping system and a seawater reservoir configured to collect unevaporated seawater draining from the evaporative panel, and the method further comprises causing the seawater that drains from the evaporative panel to be collected in the seawater reservoir, and causing the pumping system to recycle the collected seawater from the seawater reservoir to the evaporative panel, thereby converting the recycled seawater into brine. In some of these embodiments, the method further comprises causing the pumping system to pump the brine from the seawater reservoir to a drying tray, thereby converting the brine into salt.

And in any of the above embodiments where the apparatus comprises a cooling greenhouse, the method can include placing the mat within the cooling greenhouse at the hot, arid, coastal location, the mat being thereby surrounded by and enclosed within the cooling greenhouse.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an apparatus and method for growing vegetation in hot, arid, costal environments that provides water retention and cooling in in an at grade or below-grade environment that is adequate to enable seeds and/or seedlings to germinate and grow.

Figure 1:
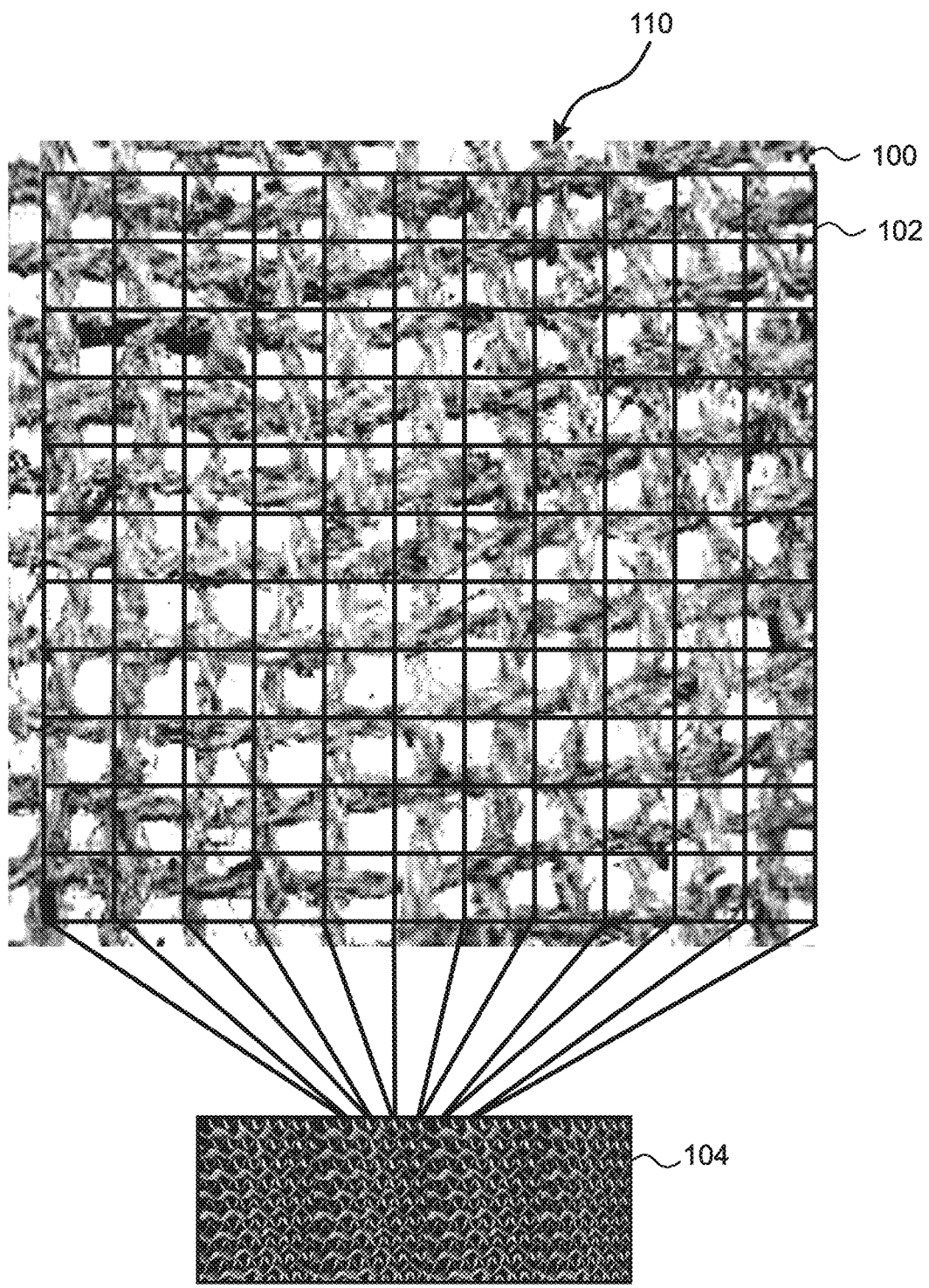
FIG. 1 is a top view of a coir fiber mat comprising a thermally conductive network in thermal communication with an evaporative panel according to the present invention.
Figure 2:
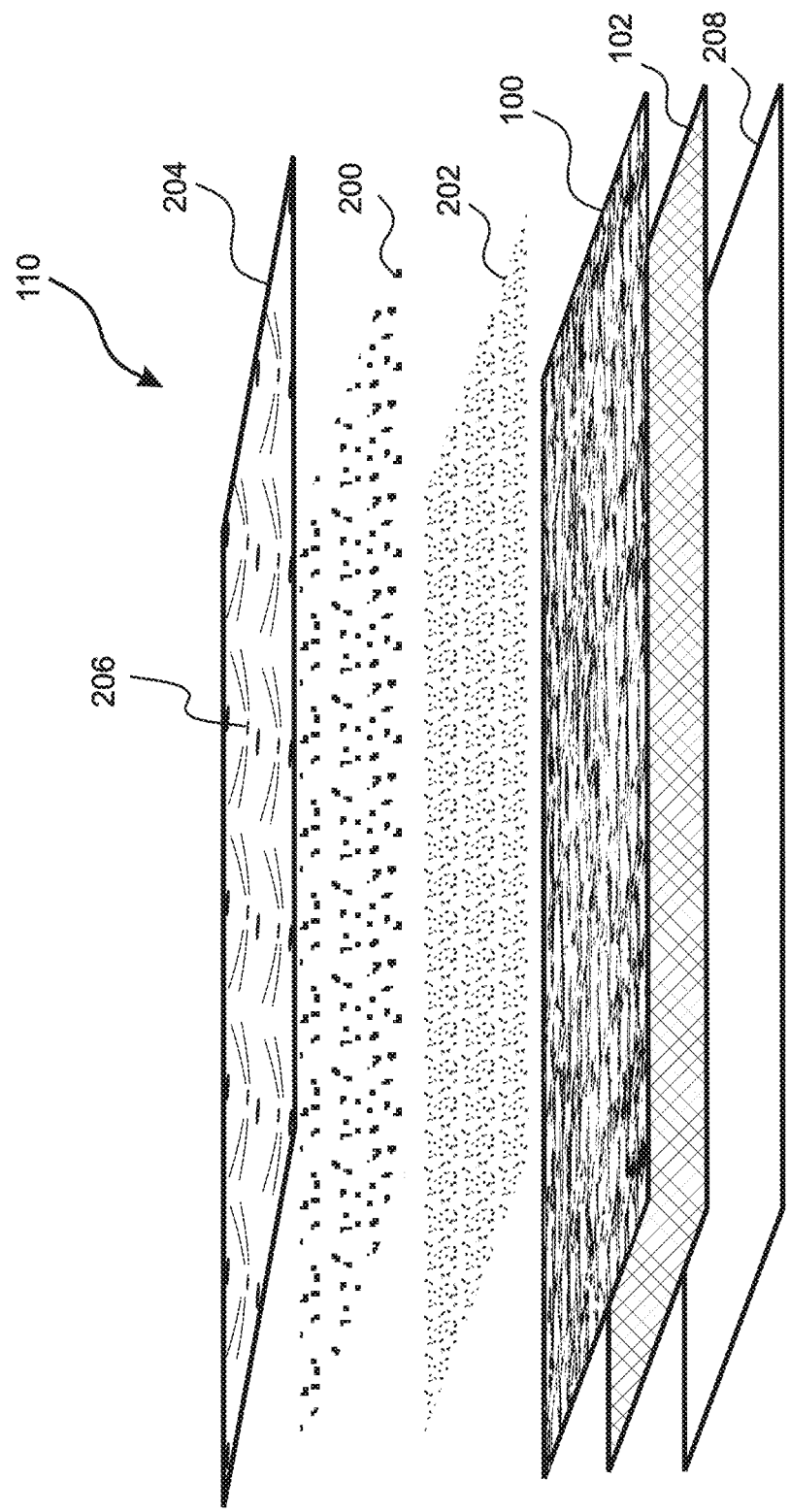
FIG. 2 is a side perspective exploded view illustrating the elements included in the mat assembly in an embodiment of the present invention.

With reference to FIGS. 1 and 2, a mat assembly 110 comprises a mat 100, which can be a biodegradable coir mat 100. The mat 100 is impregnated with seeds and/or seedlings 200 and with a "super absorbent polymer" or "SAP" 202. In embodiments, the SAP 202 is biodegradable, and in some of these embodiments the SAP 202 is a cellulose-based or starch-based polymer.

The mat assembly 110 also includes a "thermally conductive network" 102 cooperative with the mat 100 that comprises at least one mesh, web, or other network of thermally conductive fibers, such as a mesh of copper wire or a layer of spaced-apart high crystallinity polyethylene nanofibers. The thermally conductive network 102 can include conductive fibers that are interwoven into the mat 100, and/or fibers applied in direct contact with the upper and/or lower surface of the mat 100. For example, thermally conductive wires or fibers can be woven into the mat 100, and in addition, the mat 100 can be sandwiched between upper and lower thermally conductive meshes of thermally conductive fibers.

In various embodiments, the mat assembly 110 further comprises a perforated cover sheet 204 that is transparent or semi-transparent. The cover sheet 204 serves as a physical barrier to water vapor beneath the cover sheet 204 that is formed by evaporating dew, and by any moisture that is evaporated from the ground or mat 100, so that the water vapor tends to condense on the under-side of the cover sheet 204, and to drip back onto the mat 100, where it is absorbed by the SAP 202. Perforations 206 are provided in the cover sheet 204 which allow rain water to collect and penetrate through the cover sheet 204 to the mat 100. In embodiments, the perforations 206 are in locations where rain water will naturally collect.

In some embodiments, the mat assembly 110 further include a water barrier 208 placed below the mat 100, which prevents any water that is not retained by the mat 100 and SAP 202 from reaching the underlying soil or sand. This feature can be especially helpful in sandy locations where any moisture that reaches the underlying sand will be quickly absorbed and lost. The water barrier 208 can be a plastic sheet, and can be cellulosic or otherwise biodegradable.

In some embodiments, fertilizer (not shown) is included in the mat assembly 110. And in various embodiments at least one of sand and soil (not shown) is included in the mat assembly 110. The included sand or soil in some of these embodiments has a composition that is similar to sand or soil that is indigenous to the hot, arid, coastal location.

Figure 3A:
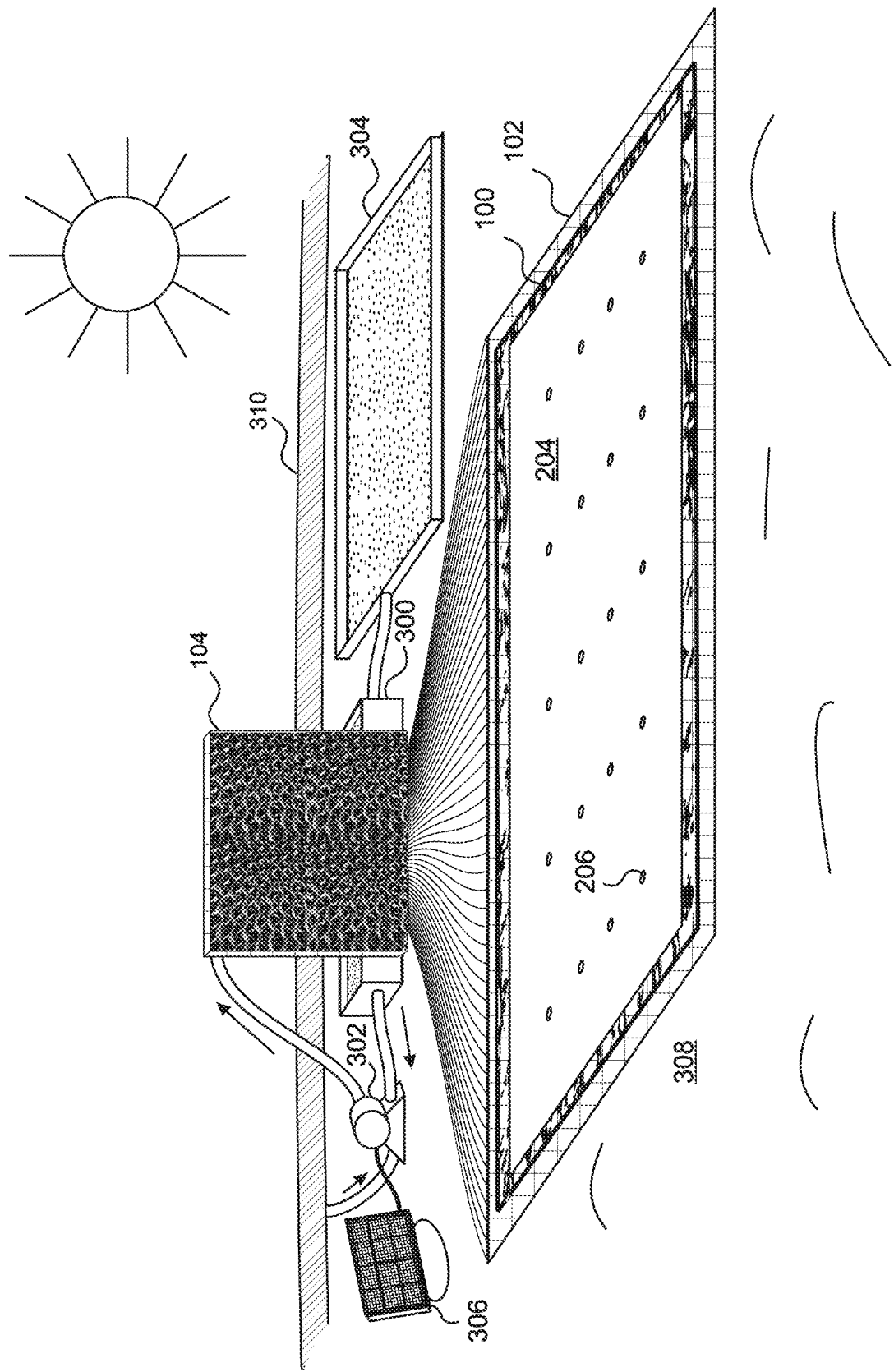
FIG. 3A is perspective view of an embodiment of the present invention shown upon initial installation at a hot, arid, coastal location, wherein the embodiment includes a single evaporative panel.
Figure 3B:
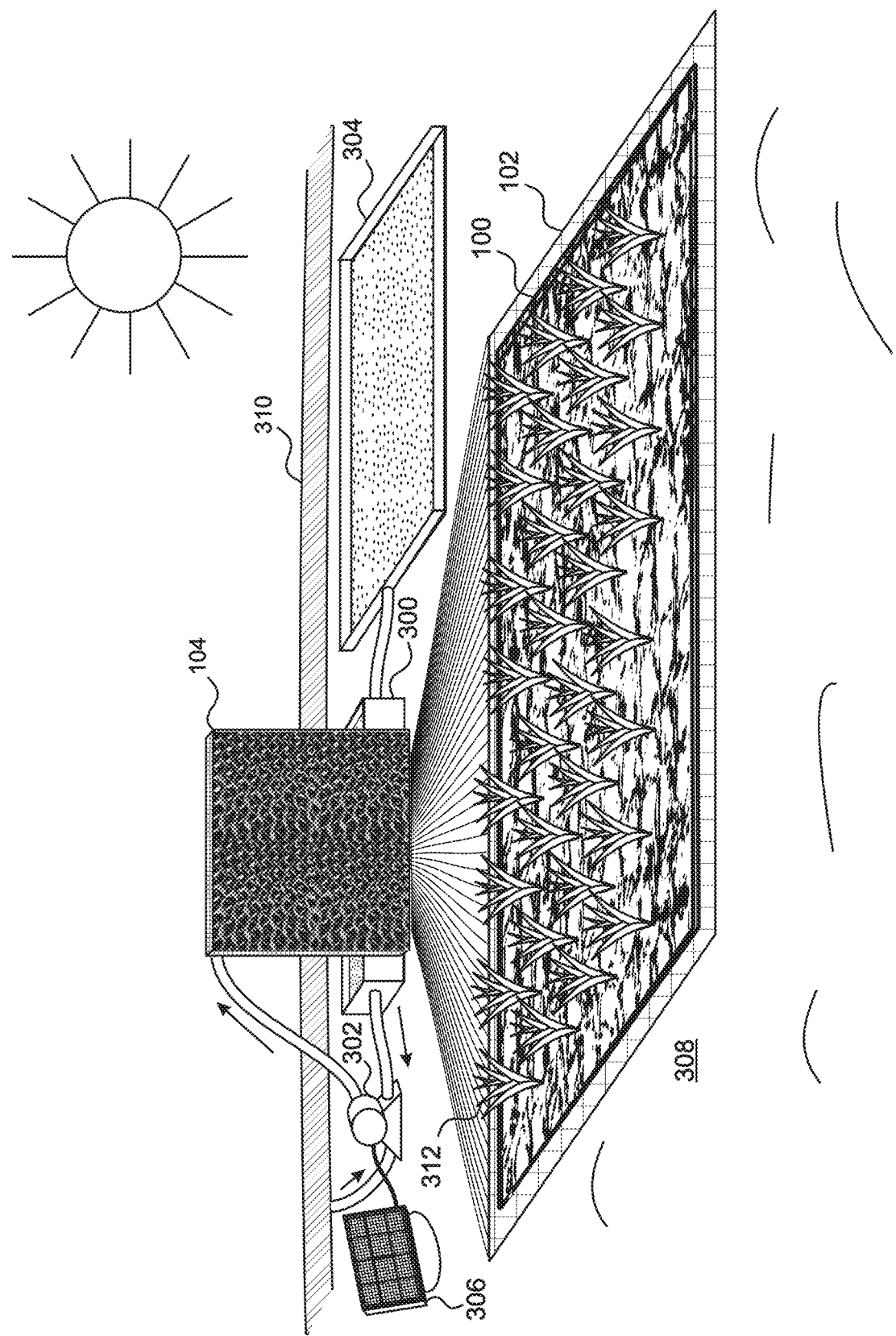
FIG. 3B is a perspective view of the embodiment of FIG. 3A, shown after the seeds in the mat have sprouted into above-grade vegetation.

With reference to FIGS. 3A and 3B, according to the method of the present invention, the mat assembly 110 is placed at the hot, arid costal location 308, either at grade or slightly below grade, and sufficient fresh water is applied to the mat 100 to cause the SAP 202 in the mat 100 to become hydrated, thereby enabling the seeds and/or seedlings 200 to sprout and/or take root in the mat 100. An evaporative cooling system comprising at least one evaporative panel 104 is located near the mat assembly 110, and is in thermal communication with the thermally conductive network 102 that is cooperative with the mat assembly 110. Seawater 310 is applied to the at least one evaporative panel 104, causing the panel 104 to be cooled by evaporation of the seawater 310, so that the evaporative panel 104 draws heat away from the mat 100 via the thermally conductive network 102, thereby further reducing evaporative loss of moisture from the mat 100.

In embodiments, seawater 310 that is not evaporated from the evaporative panel 104 is collected in a reservoir 300 and recycled by a pump 302 to the evaporative panel 104, thereby slowly converting the circulated seawater into a high saline brine, which can be diverted into one or more drying trays 304 to produce salt as a marketable byproduct, while fresh seawater 310 is periodically delivered to the reservoir 300. In embodiments, the energy that is required to pump the seawater and brine is supplied by one or more solar panels 306. FIG. 3A illustrates an embodiment as it is configured shortly after being placed at the hot, arid coastal location, while FIG. 3B illustrates the same embodiment shown after vegetation 312 has taken root in the mat 100 and grown above grade 308.

Figure 4A:
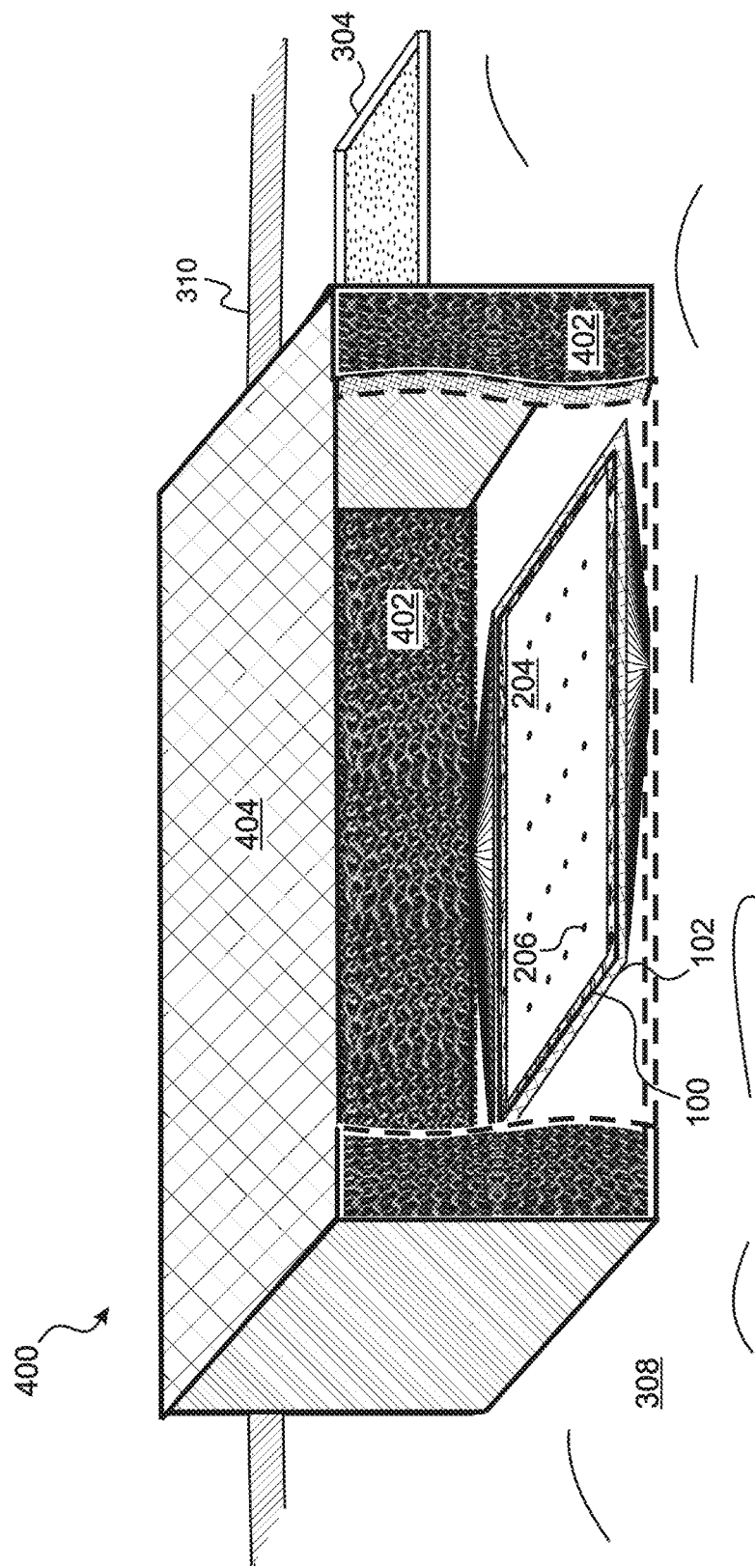
FIG. 4A is a perspective view of a mat contained within, and surrounded by, a cooling greenhouse according to an embodiment of the present invention, wherein the evaporative cooling system comprises two evaporative panels incorporated into opposing walls of the cooling greenhouse, the mat being shown immediately after installation at the hot, arid, coastal location.
Figure 4B:
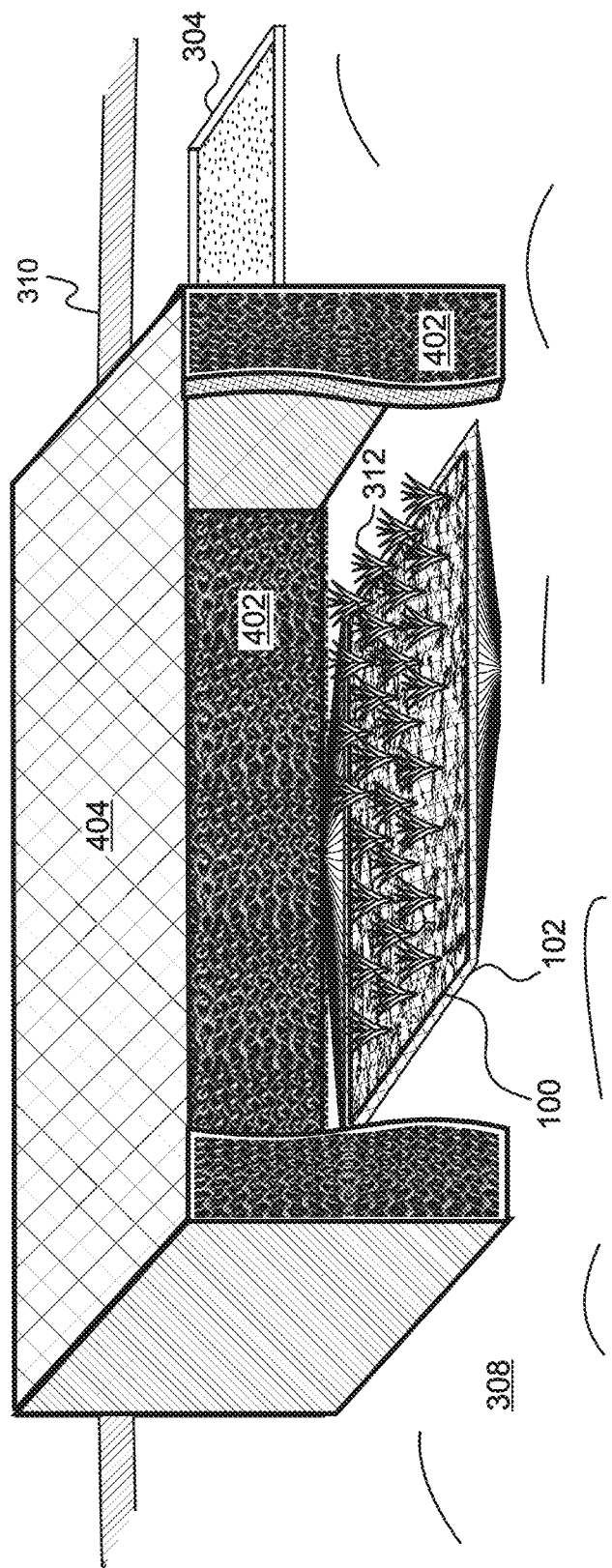
FIG. 4B is a perspective view of the embodiment of FIG. 4A, shown after the seeds in the mat have sprouted into above-grade vegetation.

In FIGS. 1-3B, the evaporative cooling system comprises a single evaporative panel 104 that is offset from an otherwise exposed mat assembly 110. With reference to FIGS. 4A and 4B, in other embodiments the cooling structure is at least one cooling wall 402 of a cooling "greenhouse" 400 in which the mat assembly 110 is sited. According to this approach, seeds and/or seedlings that do not rise significantly above grade 308 are cooled by thermal conduction from the thermally conductive network 102 to the cooling wall(s) 402. As the vegetation germinates and grows above grade 308, it receives additional cooling due to surrounding air that is cooled as it passes through the evaporative wall(s) 402 into the greenhouse 400.

The cooling greenhouse 400 can further include an open mesh top 404 that allows precipitation to enter the greenhouse 400, and also allows heated air to rise upward out of the greenhouse 400. The open mesh top 404 can also serve to reduce the amount of direct sunlight that impinges on the mat assembly 110 and the vegetation 312. In FIG. 4, the evaporative walls 402 are positioned such that onshore and offshore breezes will impinge upon them. The central portion of the front evaporative wall 402 has been omitted to enable the interior of the greenhouse 400 to be viewed. FIG. 4A illustrates an embodiment as it is configured shortly after being placed at the hot, arid coastal location, while FIG. 4B illustrates the same embodiment shown after vegetation 312 has taken root and grown above grade 308.

Figure 5A:
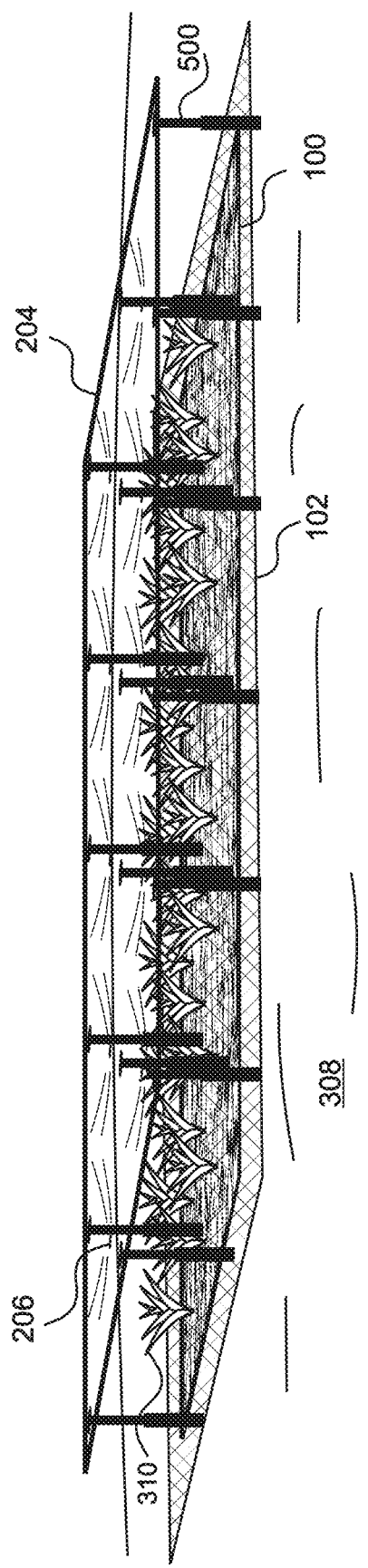
FIG. 5A is a perspective view of an embodiment of the present invention that includes a transparent perforated cover sheet suspended above the mat by stakes.
Figure 5B:
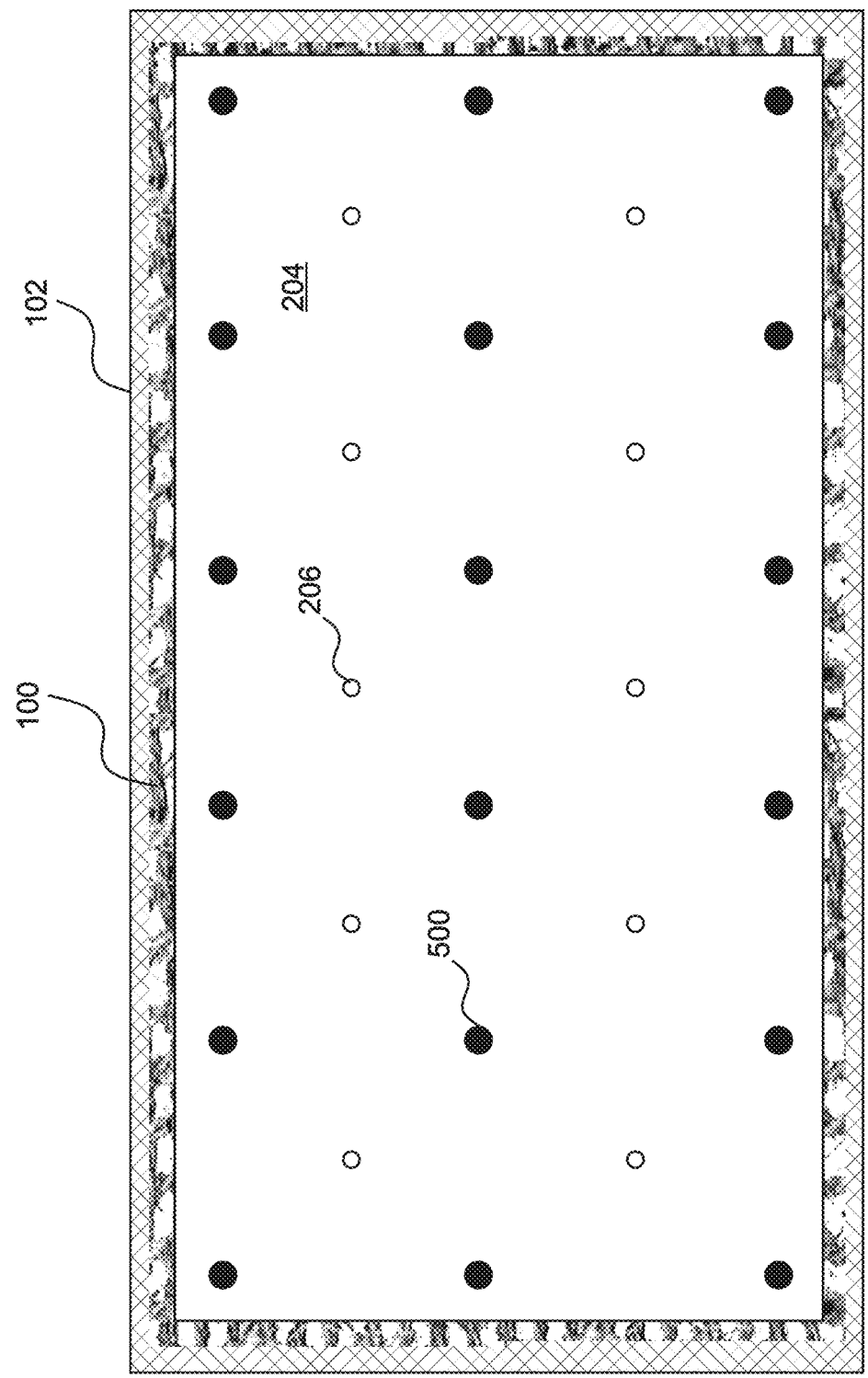
FIG. 5B is a top view of the embodiment of FIG. 5A, where the cover sheet is shown as if it were opaque for clarity of illustration.

In the embodiments of FIGS. 2-4B, the cover sheet 204 is placed directly onto the mat. With reference to FIGS. 5A and 5B, in other embodiments the cover sheet 204 is supported by stakes 500, which can be adjustable in height, for example due to a threaded, telescoping configuration. Similar embodiments use other support structures that are either fixed or adjustable in height. In the embodiment of FIGS. 5A and 5B, the cover sheet 204 is elevated by the stakes 500 around its perimeter, such that the region below the cover sheet 204 is ventilated, thereby avoiding excess heating of the vegetation. FIG. 5A is a perspective side view of the embodiment, while FIG. 5B is a top view of the same embodiment.

In some embodiments the cover sheet 204 is transparent, as shown in FIG. 5A. In similar embodiments, for example where there is excessive direct sunshine, the opacity of the cover sheet 204 is increased by printing a pattern onto the cover sheet 204, adding a dye to the sheet material of the cover sheet, or by any other means known in the art, so as to reduce the intensity of light reaching the mat 100 and vegetation 312, thereby simulating the shade that would be provided by mature vegetation in an established ecosystem. The cover sheet 204 in FIG. 5B is drawn as if it were opaque, for clarity of illustration.

Figure 6:
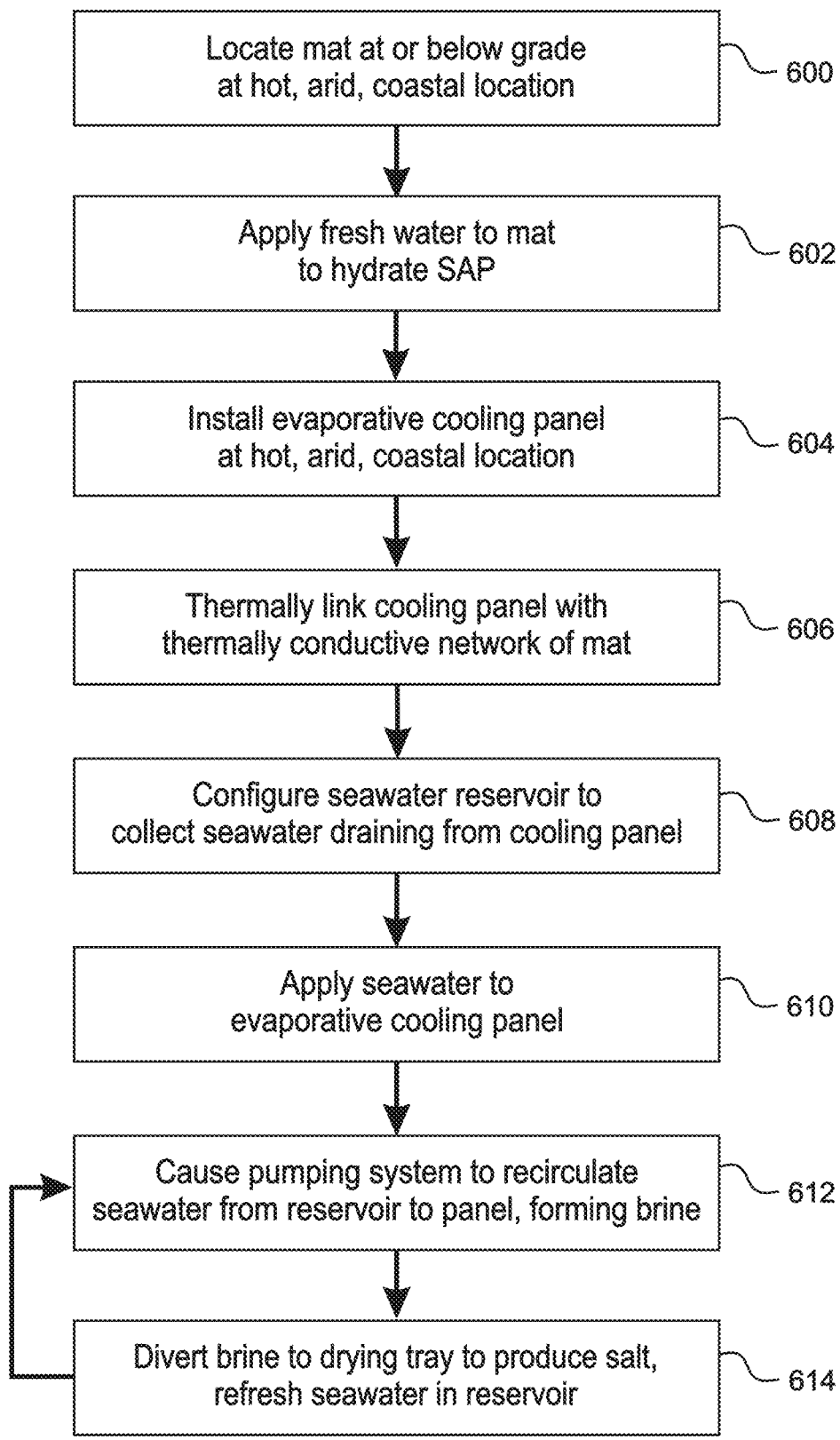
FIG. 6 is a flow diagram illustrating the steps of a method embodiment of the present invention.

FIG. 6 is a flow diagram that illustrates a method embodiment of the present invention. After placing 600 the mat 100 containing seeds 200 and SAP 202 at or below grade at the hot, arid, coastal location 308, fresh water is applied 602 to the mat 100 to hydrate the SAP 202. The evaporative panel 104 is installed 604 at the hot, arid, coastal location 308, and thermally linked 606 to the thermally conductive network 102 that is cooperative with the mat 100. A seawater reservoir 300 is installed 608 below the evaporative panel 104 and configured to collect unevaporated seawater that drains from the evaporative panel 104. A pumping system introduces seawater into the seawater reservoir 300, and applies 610 the seawater to the evaporative panel 104. As unevaporated seawater drains into the seawater reservoir 300, it is recirculated 612 to the evaporative panel by the pumping system, thereby converting the recirculated seawater into brine. Periodically, the brine is diverted 614 by the pumping system to a drying tray 304 to be converted into salt, and the seawater in the seawater reservoir 300 is replenished with coastal seawater.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. An apparatus for growing vegetation in a hot, arid, coastal location, the apparatus comprising:
    a mat;
    a super-absorbent polymer ("SAP") cooperative with the mat;
    seeds and/or seedlings cooperative with the mat;
    a thermally conductive network cooperative with the mat; and
    an evaporative cooling system comprising an evaporative panel in thermal communication with the thermally conductive network; and
    wherein the apparatus is configured to cause evaporative cooling of the evaporative panel to draw heat from the seeds and/or seedlings via the thermally conductive network.

2. The apparatus of claim 1, wherein the mat includes coir.

3. The apparatus of claim 1, further comprising fertilizer cooperative with the mat.

4. The apparatus of claim 1, further comprising at least one of sand and soil cooperative with the mat.

5. The apparatus of claim 1, further comprising a perforated, transparent or translucent cover sheet configured for covering the mat.

6. The apparatus of claim 5, further comprising a support structure configured for suspending the cover sheet above the mat.

7. The apparatus of claim 6, wherein the support structure includes a plurality of stakes that support the cover sheet at spaced-apart support locations below the cover sheet.

8. The apparatus of claim 7, wherein the cover sheet is perforated at locations that are spaced apart from the support locations of the stakes.

9. The apparatus of claim 1, further comprising a water barrier configured for placement below the mat.

10. The apparatus of claim 1, wherein the evaporative cooling system further comprises a seawater reservoir configured to collect seawater that drains from the evaporative panel.

11. The apparatus of claim 10, wherein the evaporative cooling system further comprises a pumping system configured to recycle the collected seawater from the seawater reservoir to the evaporative panel, thereby converting the recycled seawater into brine.

12. The apparatus of claim 11, wherein the evaporative cooling system further comprises a drying tray configured to accept the brine when the brine is pumped by the pumping system from the seawater reservoir to the drying tray, and to convert the brine into salt.

13. The apparatus of claim 10, further comprising a solar energy system configured to convert solar energy into electricity and to direct the electricity to the evaporative cooling system.

14. The apparatus of claim 1, wherein the evaporative panel is incorporated into a wall of a cooling greenhouse that is configured to contain and surround the mat.

15. The apparatus of claim 14, wherein the evaporative panel is a first of a plurality of evaporative panels incorporated into a plurality of walls of the cooling greenhouse.

16. The apparatus of claim 14, wherein the cooling greenhouse further comprises a mesh cover that is permeable to air and rainwater while reducing an amount of sunlight impinging on the mat when the mat is contained within and surrounded by the cooling greenhouse.

17. A method of growing vegetation at a hot, arid, costal location, the method comprising:
locating an apparatus configured according to claim 1 at the hot, arid, coastal location, the mat being placed at grade or below grade;
applying fresh water to the mat, thereby hydrating the SAP in the mat; and
applying seawater to the evaporative panel, thereby cooling the evaporative panel and causing the evaporative panel to draw heat from the seeds and/or seedlings via the thermally conductive network.

18. The method of claim 17, wherein:
the evaporative cooling system further comprises a seawater reservoir configured to collect seawater that drains from the evaporative panel and a pumping system configured to recycle the collected seawater from the seawater reservoir to the evaporative panel, thereby converting the recycled seawater into brine; and
the method further comprises causing the seawater that drains from the evaporative panel to be collected in the seawater reservoir, and causing the pumping system to recycle the collected seawater from the seawater reservoir to the evaporative panel, thereby converting the recycled seawater into brine.

19. The method of claim 18, wherein:
the evaporative cooling system further comprises a drying tray configured to accept the brine when the brine is pumped by the pumping system from the seawater reservoir to the drying tray, and to convert the brine into salt; and
the method further comprises causing the pumping system to pump the brine from the seawater reservoir to the drying tray, thereby converting the brine into salt.

20. The method of claim 17, wherein:
the evaporative panel is incorporated into a wall of a cooling greenhouse that is configured to contain and surround the mat; and
locating the apparatus at the hot, arid, coastal location includes placing the mat within the cooling greenhouse, the mat being thereby surrounded by and enclose within the cooling greenhouse.

\* \* \* \* \*